US010628636B2

(12) United States Patent
Moharrami et al.

(10) Patent No.: US 10,628,636 B2
(45) Date of Patent: Apr. 21, 2020

(54) LIVE-CONVERSATION MODULES ON ONLINE SOCIAL NETWORKS

(71) Applicant: Facebook, Inc., Menlo Park, CA (US)

(72) Inventors: Mohammad Moharrami, Seattle, WA (US); Markus Christian Messner Chaney, San Francisco, CA (US); Li-Tal Mashiach, Redmond, WA (US); Yuval Kesten, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 611 days.

(21) Appl. No.: 14/695,540

(22) Filed: Apr. 24, 2015

(65) Prior Publication Data

US 2016/0314113 A1    Oct. 27, 2016

(51) Int. Cl.
| G06F 17/27 | (2006.01) |
| H04L 12/58 | (2006.01) |
| G06F 40/30 | (2020.01) |
| G06Q 50/00 | (2012.01) |
| G06F 40/279 | (2020.01) |
| G06F 40/284 | (2020.01) |

(52) U.S. Cl.
CPC ............ *G06F 40/30* (2020.01); *G06F 40/279* (2020.01); *G06F 40/284* (2020.01); *G06Q 50/01* (2013.01); *H04L 51/32* (2013.01)

(58) Field of Classification Search
CPC ... G06F 17/2785; G06F 17/2765; H04L 51/32
USPC .......................................................... 704/9
See application file for complete search history.

(56) References Cited

U.S. PATENT DOCUMENTS

| 5,918,014 | A  | 6/1999  | Robinson |
| 6,539,232 | B2 | 3/2003  | Hendrey |
| 6,957,184 | B2 | 10/2005 | Schmid |
| 7,069,308 | B2 | 6/2006  | Abrams |
| 7,379,811 | B2 | 5/2008  | Rasmussen |
| 7,539,697 | B1 | 5/2009  | Akella |
| 7,752,326 | B2 | 7/2010  | Smit |
| 7,783,630 | B1 | 8/2010  | Chevalier |
| 7,836,044 | B2 | 11/2010 | Kamvar |
| 8,027,990 | B1 | 9/2011  | Mysen |
| 8,060,639 | B2 | 11/2011 | Smit |
| 8,112,529 | B2 | 2/2012  | Van Den Oord |
| 8,180,804 | B1 | 5/2012  | Narayanan |
| 8,185,558 | B1 | 5/2012  | Narayanan |
| 8,239,364 | B2 | 8/2012  | Wable |
| 8,244,848 | B1 | 8/2012  | Narayanan |
| 8,271,471 | B1 | 9/2012  | Kamvar |
| 8,271,546 | B2 | 9/2012  | Gibbs |
| 8,301,639 | B1 | 10/2012 | Myllymaki |
| 8,306,922 | B1 | 11/2012 | Kunal |

(Continued)

*Primary Examiner* — Edwin S Leland, III
(74) *Attorney, Agent, or Firm* — Baker Botts L.L.P.

(57) ABSTRACT

In one embodiment, a method includes accessing one or more posts of an online social network; extracting n-grams from each post; determining, for each post, whether it is associated with a trending topic based on whether one or more of the extracted n-grams are associated with the trending topic; caching each post determined to be associated with the trending topic in a corresponding conversation cache; calculating a quality-score for each cached post; and generating a live-conversation module comprising one or more of the cached posts having a quality-score above a threshold quality-score.

35 Claims, 6 Drawing Sheets

(56) References Cited

U.S. PATENT DOCUMENTS

| | | |
|---|---|---|
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,043,417 B1* | 5/2015 | Jones ............... H04L 63/1416 709/206 |
| 2002/0086676 A1 | 7/2002 | Hendrey |
| 2002/0133347 A1* | 9/2002 | Schoneburg ........... G06F 40/35 704/257 |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1 | 8/2006 | Richardson |
| 2007/0277100 A1 | 11/2007 | Sheha |
| 2008/0033926 A1 | 2/2008 | Matthews |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0094200 A1 | 4/2009 | Baeza-Yates |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0265326 A1 | 10/2009 | Lehrman |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0125562 A1 | 5/2010 | Nair |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0153770 A1* | 6/2011 | Antani ............... G06F 12/0877 709/208 |
| 2011/0191371 A1 | 8/2011 | Elliott |
| 2011/0196855 A1 | 8/2011 | Wable |
| 2011/0231296 A1* | 9/2011 | Gross ................. G06Q 10/10 705/37 |
| 2011/0276396 A1 | 11/2011 | Rathod |
| 2011/0313992 A1 | 12/2011 | Groeneveld |
| 2011/0320470 A1 | 12/2011 | Williams |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0226918 A1 | 8/2013 | Berkhim |
| 2013/0246404 A1 | 9/2013 | Annau |
| 2014/0122465 A1 | 5/2014 | Bilinski |
| 2014/0164519 A1* | 6/2014 | Shah ................. H04L 67/306 709/204 |
| 2014/0317075 A1* | 10/2014 | Deutsch ............ G06F 16/9535 707/706 |
| 2015/0227517 A1* | 8/2015 | Lymberopoulos ......................... G06F 16/2255 707/706 |
| 2015/0350139 A1* | 12/2015 | Speer ................ G06F 16/9535 709/206 |
| 2015/0356571 A1* | 12/2015 | Chang ............... G06Q 30/0201 705/7.29 |
| 2016/0065605 A1* | 3/2016 | Yan ................... G06F 3/04847 726/23 |
| 2016/0314113 A1* | 10/2016 | Moharrami .......... G06F 40/284 |
| 2016/0373397 A1* | 12/2016 | Kesten ................ H04L 67/02 |

* cited by examiner

500

510 — accessing one or more posts of an online social network, each post comprising a content of the post and a metadata associated with the post 520 — extracting, for each post, one or more n-grams from the content of the post and the metadata associated with the post 530 — determining, for each post, whether the post is associated with a trending topic based on whether one or more of the extracted n-grams is associated with the trending topic 540 — caching, for each post determined to be associated with the trending topic, the post in a conversation cache associated with the trending topic 550 — calculating a quality-score for each cached post 560 — generating a live-conversation module comprising one or more of the cached posts having a quality-score greater than a threshold quality-score 570 — sending, to a client system of a first user of the online social network, the live-conversation module for display to the first user

*FIG. 5*

LIVE-CONVERSATION MODULES ON ONLINE SOCIAL NETWORKS

TECHNICAL FIELD

This disclosure generally relates to online social networks, and in particular generating a live-conversation module on an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may generate a live-conversation module that includes posts related to a particular topic (e.g., trending topic) on an online social network. The social-networking system may access posts of the online social network and determine whether the posts are related to the particular topic based on whether n-grams in the posts are associated with the particular topic. If the social-networking system determines that a post is in fact related to the particular topic, it may cache the post in a conversation cache associated with the particular topic. The social-networking system may then calculate a quality-score for each cached post based on one or more factors. The social-networking system may generate a live-conversation module that includes one or more of the cached posts having a quality-score greater than a threshold quality-score, and send the live-conversation module to a client system of a user for display.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 illustrates an example method 500 for generating a live-conversation module.

DESCRIPTION OF EXAMPLE EMBODIMENTS

System Overview

Figure 1:
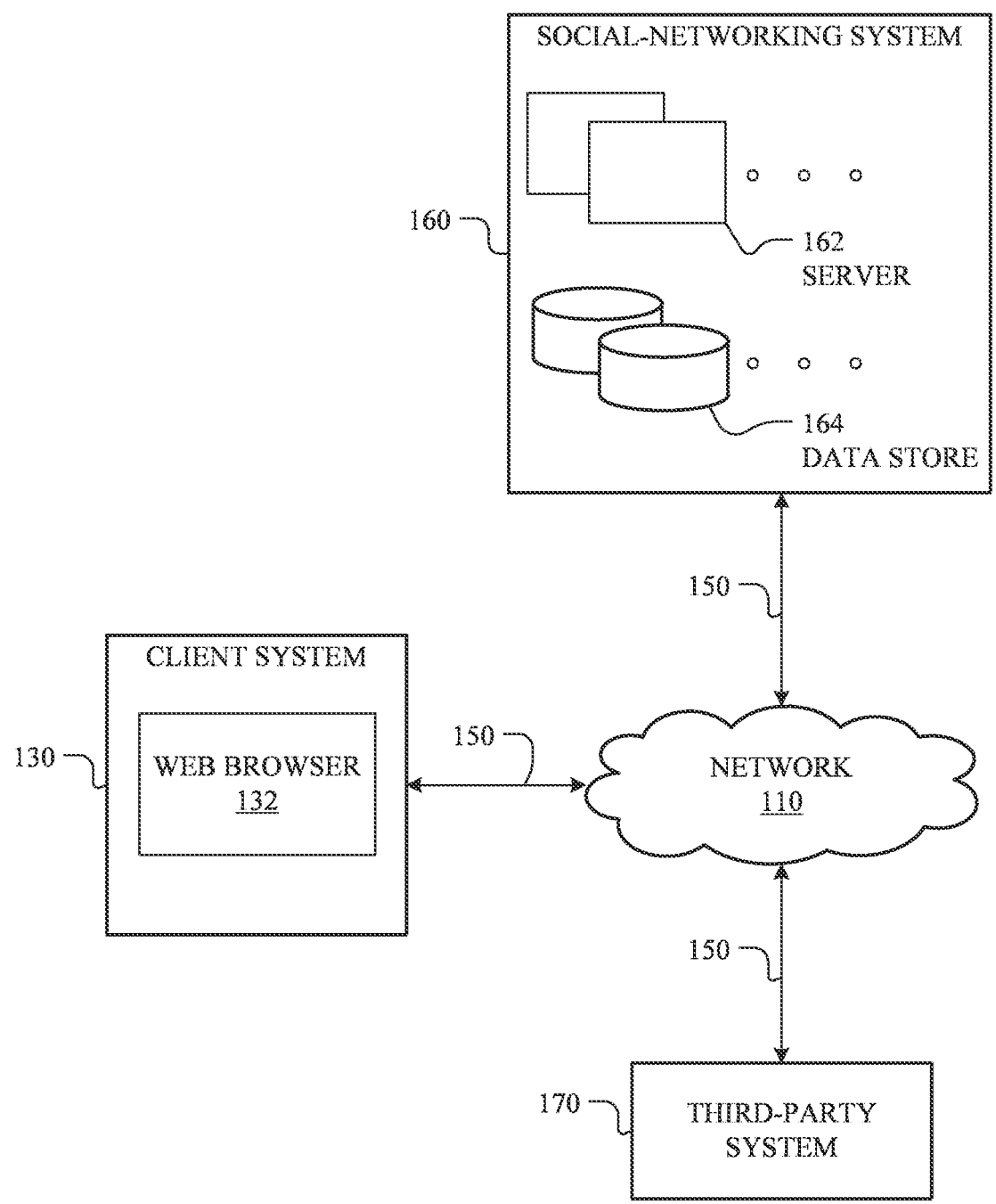
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
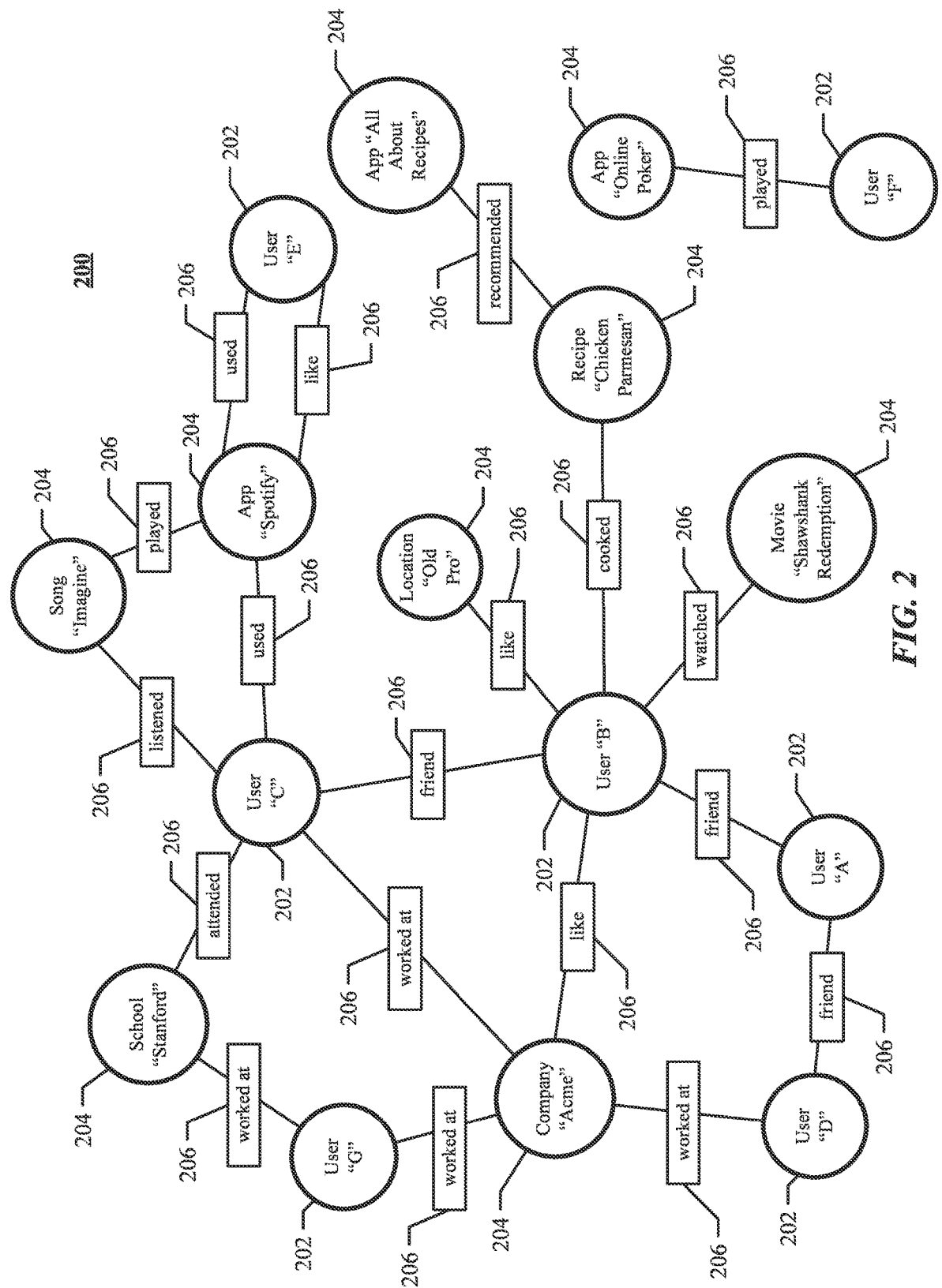
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Live-Conversation Modules

In particular embodiments, the social-networking system 160 may generate and send for display to a client system 130 of the user a live-conversation module that includes user posts related to a particular topic (e.g., a trending topic) on an online social network. As an example, a live-conversation module for a trending topic may be generated and sent to the user when a user accesses the respective trending-topics page. The live-conversation module may update continuously or semi-continuously to generate what may be considered a real-time conversation among users of the online social network regarding a particular trending topic. The social-networking system 160 may use a scoring feature to select for and display only posts that surpass a threshold quality. The scoring feature may be beneficial because there may be hundreds of posts for a given trending topic every second and only a limited number of posts may be usefully displayed to users on the online social network. The scoring feature may be especially important in filtering out spam posts. The term "post" as used herein may include a publication created by a user on a newsfeed page or homepage of the online social network, on a user's own page of the online social network (e.g., the user's timeline or wall), on the page of the user's online-social-network connection (e.g., a timeline or wall of the user's first-degree connection or "friend"), on the page of a group on the online social network (e.g., a timeline or wall of a group related to a hobby), or on another suitable page of the online social network, where the publication does not reference another publication on the online social network. The term "reshare" as used herein may include a publication created by a user on the online social network, where the publication references another publication on the online social network (for example, a post may be linked to or embedded in the reshare). While this disclosure focuses on describing a live-conversation module for posts in the trending topics context, this disclosure contemplates using such modules in other search-related contexts (e.g., generating a live-conversation module as part of a search-results page in response to any suitable search query, such as a structured query or a keyword query). Similarly, while this disclosure focuses on describing live-conversation modules for trending topics, this disclosure contemplates live-conversation modules for any suitable topic. Finally, although this disclosure focuses on a live-conversation module that includes posts, this disclosure also contemplates such modules including reshares, comments, messages, or other suitable content associated with the online social network.

Figure 3:
FIG. 3 illustrates an example of a post made by an author.

FIG. 3 illustrates an example of a post made by an author. In particular embodiments, the social-networking system 160 may access one or more posts of an online social network. In particular embodiments, the social-networking system 160 may only access public posts (i.e., posts that are generally viewable by all users of an online social network). Each post may comprise content and metadata associated with the post. As an example and not by way of limitation, a post may be accessed when it is first made by an author of the post (e.g., a user or entity associated with the online social network). In particular embodiments, the social-networking system 160 may then make an initial determination as to whether the post was a user post (i.e., a post originating from a user profile and not, for example, a company profile). As an example and not by way of limitation, referencing FIG. 3, the social-networking system 160 may access the post 330 and determine that it is a user post originating from a user profile for the author, "Steve." The content of the post 330 may include the text of the post 330 (e.g., "So epic. Near-Impossible Super Mario World Glitch . . . ."). The metadata associated with a post may include the name of the post's author, the date and time associated with the post, a location associated with the post (e.g., "San Jose, Calif."), the number of "likes" associated with the post, the number of shares of the post, the number of views of the post, other suitable data associated with the post, or any combination thereof. The metadata associated with the post may also include blurbs and titles of any external webpage linked in the post, as well as information regarding the authors, topics, or sponsorship associated with the post and/or external content (which may either be retrieved from the external content or provided by the external-content provider as pre-tagged information associated with the post). In particular embodiments, social-networking system 160 may access the content and metadata of comments associated with a post. In particular embodiments, a post may also be accessed when it is reshared by another user. Although this disclosure describes accessing particular posts in a particular manner, this disclosure contemplates accessing any suitable posts, reshares, or comments in any suitable manner.

In particular embodiments, the social-networking system 160 may extract, for each post, one or more n-grams from the content and metadata associated with the post. The extracting of n-grams may involve, for example, the social-networking system 160 parsing the content of the post and the metadata associated with the post to identify one or more n-grams. In general, an n-gram may be a contiguous sequence of n items from a given sequence of text. The items may be characters, phonemes, syllables, letters, words, base pairs, prefixes, or other identifiable items from the sequence of text or speech. The n-gram may include one or more characters of text (letters, numbers, punctuation, etc.) in the content of a post or the metadata associated with the post. In particular embodiments, each n-gram may include a character string (e.g., one or more characters of text). In particular embodiments, an n-gram may include more than one word. As an example and not by way of limitation, referencing FIG. 3, the social-networking system 160 may parse some or all of the text of the content of the post 330 (e.g., "So epic. Near-Impossible Super Mario World Glitch . . . .") to identify n-grams that may be extracted. The social-networking system 160 may identify, among others, the following n-grams: so; epic; so epic; near; impossible; near-impossible; super; mario; world; super mario world; and glitch. Some or all of the n-grams may be extracted. For example, the n-grams "super mario world," "glitch," and "impossible" may be extracted. As another example and not by way of limitation, social-networking system 160 may parse some or all of the text from the name of the author of the post 330 (e.g., "Steve"), other suitable content or metadata associated with the post (e.g., "San Jose, Calif.," the location associated with the post 330; "kotaku.com," the source of the link in the post 330), or any combination thereof. In particular embodiments, content and metadata from a post's comments may also be extracted. In particular embodiments, the social-networking system 160 may extract n-grams from a post based on a term frequency-inverse document frequency (TF-IDF) analysis of the content of the post in relation to a set of posts. The TF-IDF is a statistical measure used to evaluate how important a word is to a document (e.g., a post) in a collection or corpus (e.g., a set of posts). The importance increases proportionally to the number of times a word appears in a particular document, but is offset by the frequency of the word in the corpus of documents. The importance of a word in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf (t, d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. As an example and not by way of limitation, referencing FIG. 3, a TF-IDF analysis of the text of the post 330 may determine that the n-grams "super" and "mario" should be extracted, where these n-grams have high importance within the post 330. Similarly, a TF-IDF analysis of the post 330 may determine that the n-grams "so," "for," and "on" should not be extracted, where these n-grams have a low importance within the post 330 (because these are common terms in many posts). Although this disclosure describes extracting particular n-grams from particular content and metadata in a particular manner, this disclosure contemplates extracting any suitable n-grams from any suitable place in any suitable manner.

In particular embodiments, the social-networking system 160 may determine, for each post, whether the post is associated with a particular topic, which may be a trending topic, based on whether one or more of the extracted n-grams are associated with the trending topic. The social-networking system 160 may determine the topic associated with a post by first determining the topics associated with the n-grams of the post (e.g., from its content and metadata). The one or more topics may be selected from a subject dictionary of social-networking system 160. The subject dictionary may include a set of interconnected nodes, which represent topics, connected by edges representing relatedness between the nodes. Social-networking system 160 may create the subject dictionary once, updating the dictionary organically over time, or it may create a new dictionary from scratch periodically. In particular embodiments, social-networking system 160 may create a subject dictionary based on a publicly available database, such as an online encyclopedia database. Social-networking system 160 may determine the one or more topics associated with each extracted keyword by matching each extracted keyword with one or more appropriate nodes in the subject dictionary. Topic association involves discriminating among various possible topics to determine the most appropriate topic for a keyword. This may be done by, for example, determining the context of the post by using a forward-backward algorithm to calculate a probability of the extracted keyword matching the topic based on adjacent n-grams that match the topic also being present. More information on topic association may be found in U.S. patent application Ser. No. 13/167,701, filed 23 Jun. 2011, and U.S. patent application Ser. No. 14/585, 782, filed 30 Dec. 2014, each of which is incorporated by reference. As an example, and not by way of limitation, referencing FIG. 3, the n-gram "mario" in the post 330 may be associated with the topic "Super Mario World: Video Game" and not the topic "Mario Winans: Singer." In particular embodiments, to determine whether the post is associated with a trending topic, the social-networking system 160 may first access a list of trending topics that are currently trending on the online social network. The social-networking system 160 may then match the one or more n-grams from the post with one or more n-grams associated with one or more trending topics on the list of trending topics. The list of trending topics may be populated by topics that have achieved a threshold popularity on the online social network. A topic may achieve a threshold popularity on the online social network if there exists a threshold number of posts, reshares, comments, or any combination thereof on the social-networking system associated with the topic (i.e., the topic has become a big enough source of discussion on the online social network). In particular embodiments, the popularity of a topic may be based on its popularity outside the online social network, which may be determined by the social-networking system 160 by crawling an outside source (e.g., an online index, database, or news source). As an example and not by way of limitation, the social-networking system 160 may determine that a topic related to a news item is popular if it is featured prominently on a website of a particular news source. Although this disclosure describes determining whether posts are associated with a trending topic in a particular manner, this disclosure contemplates determining whether posts are associated with any suitable topic in any suitable manner.

In particular embodiments, the social-networking system 160 may, for each post determined to be associated with the trending topic, cache the post in a conversation cache associated with the particular topic, which may be a trending topic. The posts may be cached on one or more data stores 164 of the social-networking system 160. As an example and not by way of limitation, a conversation cache associated with the trending topic may be cached entirely on a single data store 164. Alternatively, a conversation cache may be partitioned across multiple data stores 164 (e.g., based on a location associated with the post). Furthermore, the posts may be indexed in any suitable manner. As an example and not by way of limitation, posts in a conversation cache may be indexed chronologically (e.g., from newest post to oldest post). Although this disclosure describes caching posts associated with trending topics in a particular manner, this disclosure contemplates caching posts associated with any suitable topic in any suitable manner.

Figure 4:
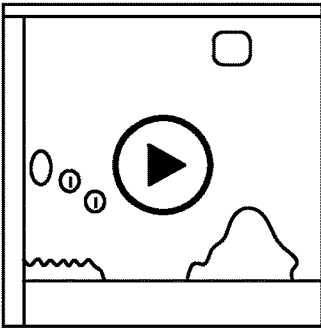
FIG. 4 illustrates an example portion of a search-results page that includes a live-conversation module.

FIG. 4 illustrates an example portion of a search-results page that includes a live-conversation module. In particular embodiments, the social-networking system 160 may calculate a quality-score for each cached post. In particular embodiments, the quality-score of a post may be based on the number of n-grams in the post that are related to the particular topic, which may be a trending topic. The social-networking system may determine that an n-gram is related to a topic such as the particular topic (e.g., a trending topic) if the n-gram matches n-grams associated with the topic. In particular embodiments, the quality-score of a post may be based on the quality of the match between the n-grams of the post and n-grams associated with the trending topic. The quality of the match may be based on a relationship between the topics associated with the n-grams of the post and the trending topic. As an example and not by way of limitation, referencing FIG. 4, the n-gram "game" in a post may be a medium quality match for the trending topic "Near-Impossible Super Mario World Glitch Done for First Time on SNES" (as determined by the social-networking system 160 in describing the topic of conversation referenced by the link 410). As another example and not by way of limitation, referencing FIG. 4, the n-gram "mario glitch" may be a high-quality match. The quality of the match may be based on a ratio or number of characters that match each substantially matching n-gram associated with the trending topic. As an example and not by way of limitation, referencing FIG. 4, the social-networking system 160 may determine a high-quality match between the n-gram "glitches" in a post and the n-gram "glitch" associated with the trending topic. In particular embodiments, the social-networking system 160 may determine the quality of the match based on the edit distance between an n-gram of a post and an n-gram associated with a trending topic. Edit distance is a way of quantifying how dissimilar two strings (e.g., words) are to one another by counting the minimum number of operations required to transform one string into the other (e.g., the number of characters that need to be changed and the relative position of the characters). As an example and not by way of limitation, the n-gram "john wanye" may be a high-quality match for the topic "John Wayne" because only a single operation is required to transform "wanye" into "wayne" (a switch of the characters "n" and "y" in "wanye"). In particular embodiments, the quality-score of a post may be based on the presence of undesirable content in posts. As an example and not by way of limitation, posts with expletives or offensive terms may receive a low quality-score. An another example and not by way of limitation, posts with too many capitalizations (e.g., a high ratio of capitalized letters to non-capitalized letters) or nonconventional capitalizations may receive a reduced score. In particular embodiments, the quality-score of a post may be based on the social signals (e.g., the number of likes, comments, reshares) associated with the post. In particular embodiments, the quality-score of a post may be based on an occurrence in the content of the post of language that is associated with spam. In particular embodiments, this may be based on the occurrence of one or more n-grams in the content or metadata of the post that are associated with spam. The social-networking system 160 may use a machine-learning algorithm to determine n-grams associated with spam. The algorithm may comprise, for example, a library of character structures associated with spam. As an example and not by way of limitation, the presence of the character strings "free!" or "$$$" may be associated with spam. In particular embodiments, the quality-score of a post may be based on a sentiment of the post. As an example and not by way of limitation, a post that is associated with positive emotions may receive a higher quality-score than a post associated with negative emotions. As another example and not by way of limitation, a post that may amount to negative social interactions like "cyber-bullying" may receive a lower quality-score. Although this disclosure describes calculating a quality-score for cached posts in a particular manner, this disclosure contemplates scoring cached posts in any suitable manner.

In particular embodiments, the quality-score of a post may be based on information associated with an author of the post. In particular embodiments, the information associated with the author may include the amount of time for which the author has been registered as a user on the online social network. As an example and not by way of limitation, a post by an author who has been a registered user of the online social network for a long time may receive a higher quality-score than a similar post by an author who has been a registered user for a relatively short time. The amount of time an author has been registered may be important, for example, in filtering out spam posts. Unlike legitimate user accounts, which usually have existed for years, spammer accounts may be created sporadically by spammers at times that they wish to send spam posts and may consequently be relatively new in many instances. In particular embodiments, the quality-score may only be affected by the amount of time the author has been registered if the author registered within a set period of time before the post was made. During this time, the author may be considered to be in a "probationary period," during which time the quality-scores of the author's posts may be reduced. In particular embodiments, posts created by authors during their probationary period are removed from consideration, such that the social-networking system 160 may not even calculate quality-scores for them (or may not even cache the posts). In particular embodiments, the information associated with the author may include the number of connections the author has with spammers (e.g., users on a blacklist). As an example and not by way of limitation, a post by an author who is a first- or second-degree connection of another user or group on the online social network who has previously been flagged as a spammer by the social-networking system 160 or by users of the online social network, may receive a relatively low quality-score. In other words, a user may be "gray listed" if the user is associated with users on a blacklist, and posts by gray-listed users may have their quality-scores reduced. More information on gray-listing and black-listing users may be found in U.S. Pat. No. 8,302,164, filed 22 Jul. 2004, which is incorporated by reference. As another example and not by way of limitation, a post by a user associated with an individual or group that is not on the online social network but has nevertheless been associated with spam content (e.g., a marketing company) may receive a relatively low quality-score. In particular embodiments, the information associated with the author may include demographic information associated with the author. As an example and not by way of limitation, with respect to a topic affecting people in California, a post by an author whose hometown is in California may receive a higher quality-score than a post about the topic by an author whose hometown is in Texas. In particular embodiments, the quality-score of a post may be based on geographical information associated with the post. As an example and not by way of limitation, a post originating in Paris, France related to a breaking-news event in Paris, France may receive a relatively high quality-score as compared with a similar post originating in Frankfurt, Germany. In particular embodiments, the information associated with the author may include a history of the user's past activity on the online social network. As an example and not by way of limitation, a post by an author who is active on the social network may receive a relatively high quality-score. As another example and not by way of limitation, a post by an author who regularly posts content on the timelines or walls of first-degree connections may receive a higher quality-score than a similar post by an author who does not do so and instead posts regularly on group pages or regularly sends messages to users who are not connections of the author. In particular embodiments, the information associated with the author may include a history of social signals received from other users of the online social network. This may be an indication of the author's general influence over users of the online social network and may therefore indicate that other users might be interested in the author's posts. As an example and not by way of limitation, a post by an author who has a history of receiving "likes" or "reshares" for posts in the past may receive a relatively high quality-score.

In particular embodiments, the quality-score of a post may be based on whether the author of the post is identified as a key-author with respect to a topic associated with the post (e.g., a trending topic). In particular embodiments, a key-author for a certain topic may refer to a person who is relevant to, associated with, or knowledgeable about that topic. As an example and not by way of limitation, the actor William Shatner (who acted in the TV show Star Trek) may be a key-author associated with the topic "Star Trek." In particular embodiments, a topic may have multiple key-authors associated with it. As an example and not by way of limitation, each of the members of a rock band may be key-authors associated with the band (e.g., John Lennon, Paul McCartney, George Harrison, and Ringo Starr may each be key-authors associated with the topic "The Beatles"). In particular embodiments, a key-author may be associated with multiple topics. As an example and not by way of limitation, comedian and banjo-player Steve Martin may be a key-author associated with the topic "comedy," and Steve Martin may also be a key-author associated with the topic "banjo." In particular embodiments, a key-author associated with a certain topic may also be a topic. As an example and not by way of limitation, soccer player Lionel Messi may be a key-author associated with the topic "Futbol Club Barcelona," and Lionel Messi himself may also be a topic. As another example and not by way of limitation, First Lady Michelle Obama may be a key-author associated with the topic "Barack Obama," and conversely, President Barack Obama may be a key-author associated with the topic "Michelle Obama." The key-authors may themselves may have an author-score which may be used to determine the effect of a post, reshare, comment, or message by a key-author on the object-score of an identified multimedia object. As an example and not by way of limitation, a post made by a key-author (e.g., a post about Shakira made by Shakira herself) may receive a higher quality-score than an identical post by an author who is not a key-author (e.g., a post about Shakira made by an unaffiliated user). More information on identifying key-authors and determining author-scores may be found in U.S. patent application Ser. No. 14/554,190, filed 26 Nov. 2014, which is incorporated by reference. In particular embodiments, the social-networking system 160 may base the quality-score of a post on the number of "likes," reshares, comments, or any combination thereof associated with the post, such that a post with a high number of "likes," reshares, or comments may receive a correspondingly high quality-score.

In particular embodiments, the social-networking system 160 may generate a live-conversation module. The live-conversation module may include one or more of the cached posts having a quality-score greater than a threshold quality-score. In particular embodiments, the live-conversation module may only be rendered if there are sufficient cached posts related to the trending topic within a predetermined time period (e.g., if there have been at least three related posts within the past fifteen minutes). As an example and not by way of limitation, referencing FIG. 4, the social-networking system 160 may generate the live-conversation module 430 for a particular trending topic (e.g., the trending topic "Near-Impossible Super Mario Glitch Done for First Time on SNES"), where the live-conversation module includes at least two cached posts (e.g., one from the user "Steve" and one from the user "Matt") associated with the trending topic that have quality-scores greater than a threshold quality-score. In particular embodiments, the quality-score and the threshold quality-score may correspond to a quality-rank and a threshold quality-rank, respectively. As an example and not by way of limitation, if the threshold quality-rank is set to three, only posts ranked first, second, or third may be included in the live-conversation module at a given time. In particular embodiments, there may be a pre-determined maximum number of posts that may be included in the live-conversation module. As an example and not by way of limitation, if the predetermined maximum number of posts is set to three, only three posts may be included in the live-conversation module at a given time, and these may be selected based on their respective scores or ranks. In particular embodiments, the live-conversation module is generated in response to a user accessing a search-results page. As an example and not by way of limitation, a live-conversation module may be generated in response to a user clicking on a trending-topics page. As another example and not by way of limitation, a live-conversation module may be generated in response to a user having submitted a search query. For example, the user may have entered a query for "mario" in a search field on a page of the online social network. In response, referencing FIG. 4, the social-networking system 160 may generate the live-conversation module 430 that may then be sent to the user along with other search results. Although this disclosure describes generating a live-conversation module in a particular manner, this disclosure contemplates generating any suitable module in any suitable manner.

In particular embodiments, the social-networking system 160 may send the generated live-conversation module to a client system 130 of a particular user of the online social network. As an example and not by way of limitation, the social-networking system 160 may send the live-conversation module to the client system 130 of the user after the live-conversation module is generated (which may itself occur, for example, in response to the user having accessed an associated trending-topics page). Referencing FIG. 4, the live-conversation module 430 may be sent to the user as part of a trending-topics page as one of several modules associated with the trending topic, with the module 420 being, for example, another one. As another example and not by way of limitation, the live-conversation module may be sent to the user in response to a user input (e.g., clicking a button on the trending-topics page). In particular embodiments, the social-networking system 160 may send the live-conversation module to the user as part of a search-results page in response to receiving a request from a client system 130 of the user associated with a topic (e.g., a trending topic). The social-networking system 160 may also send other responsive items, including other modules associated with the topic. As an example and not by way of limitation, the social-networking system 160, in response to receiving a search query for "oscars," may send a search results page including, for example, videos associated with the topic "The Oscars," a live-conversation module relating to the topic "The Oscars," and a friends module (i.e., a module that includes posts by friends) relating to the topic "The Oscars." In particular embodiments, the live-conversation module may be customized for the user receiving the generated live-conversation module by adjusting the quality-score of a post upward or downward with respect to that particular user, based on, for example, information associated with the user. The information associated with the user, in particular embodiments, may include demographic information associated with the user or with the author of the post being scored. As an example and not by way of limitation, the quality-score of a post may be adjusted upward if its author and the user receiving the live-conversation module are in the same age group. The information associated with the user, in particular embodiments, may include information in the user's settings or user profile. As an example and not by way of limitation, if the user settings are set to French, the quality-score of a post in French may be adjusted upward. As another example and not by way of limitation, if the user profile indicates that the user can speak Spanish, the quality-score of posts in Spanish may be adjusted upward. The information associated with the user, in particular embodiments, may include the existence of a relationship between the user and the author of a post. As an example and not by way of limitation, the quality-score of a post may be adjusted upward if its author is a first-degree connection (e.g., friend, family) or second-degree connection (e.g., friend of a friend, family of a friend) of the user. The social-networking system 160 may determine these connections by, for example, querying the social-graph. In particular embodiments, the quality-score of the post may be adjusted based on an affinity coefficient between the author of the post and the user. The concept of affinity coefficients is described in more detail below. In particular embodiments, the quality-score may be based on a history of activity by the user on the online social network. As an example and not by way of limitation, if a user has a history of awarding positive social signals to (e.g., "liking," commenting on) content posted by a particular author, the quality-score of a post by that author may be adjusted upward. For example, referencing FIG. 4, if the user has a history of liking posts by the author "Steve" in the live-conversation module 430, the quality-score of posts by the author "Steve" would be adjusted upward. As another example and not by way of limitation, if a user has a history of awarding positive social signals for (e.g., "liking," commenting on) content with particular sentiments (e.g., posts that are favorable to a particular celebrity), the quality-score of a post with a similar sentiment (e.g., a post that states a positive quality of the particular celebrity) may be adjusted upward. As another example and not by way of limitation, if a user has a history of awarding positive social signals for (e.g., "liking," commenting on) content related to an ancillary topic (e.g., another topic associated with a post that is not the trending topic), the quality-score of a post associated with that ancillary topic may be adjusted upward. For example, in a live-conversation module related to the trending topic "The Oscars," the quality-score of a post about the winner of the category "Actress in a Leading Role" may be adjusted upward if the user has commented on that category before or has otherwise shown an interest in actresses in general. In particular embodiments, the social-networking system 160 may have a de-duplication feature, such that the quality-score of a cached post is significantly reduced if it has already been displayed or is being displayed in another module on the same page (e.g., a post by a first-degree connection that already appears in a separate module for posts by friends). Alternatively, the cached post may simply be removed from the conversation cache to achieve the same goal of de-duplication. Although this disclosure describes sending a generated live-conversation module to a particular user in a particular manner, this disclosure contemplates sending any suitable module to any suitable user in any suitable manner. Similarly, although this disclosure describes adjusting a quality-score for cached posts in a particular manner, this disclosure contemplates adjusting scores of posts in any suitable manner.

In particular embodiments, the social-networking system 160 may update the live-conversation module periodically. It may do so by replacing one or more of the displayed posts in the live-conversation module with one or more other posts. As an example and not by way of limitation, it may replace one out of three displayed posts. As another example and not by way of limitation, it may replace all three of the three displayed posts. In particular embodiments, the update may be scheduled to occur at a static, pre-determined time interval (e.g., every fifteen seconds). In particular embodiments, the update may occur at intervals determined by the number of new cached posts associated with the respective trending topic. As an example and not by way of limitation, if there are many new posts being made about a particular trending topic, the social-networking system 160 may replace posts at relatively short time intervals (e.g., every six seconds). By contrast, if there are very few posts being made about the topic, the social-networking system 160 may, as an example and not by way of limitation, replace posts at relatively long time intervals (e.g., every minute). In particular embodiments, the update may occur solely based on the number of posts without considering time intervals. As an example and not by way of limitation, the social-networking system 160 may replace posts every time a threshold number of posts (e.g., five posts) about a topic is made. In particular embodiments, the other posts that replace one or more of the displayed posts during an update may be posts that were created on the online social network at a later time than the replaced posts (i.e., newer posts may replace older posts). In particular embodiments, newer posts for the module may be found by the social-networking system 160 submitting a query for cached posts above a threshold quality-score/rank within a subset of cached posts that have time-stamps later than the oldest of the currently displayed posts. In particular embodiments, newer posts may simply be "pushed" to the live-conversation module without the social-networking system 160 having to submit a query. As an example and not by way of limitation, referencing FIG. 4, the social-networking system 160 may immediately replace a displayed post (e.g., the post by the author "Matt") with a new post having to do with the same trending topic as soon as the new post is made. In particular embodiments, the other posts that replace one or more of the displayed may be selected based on their respective quality-scores. As an example and not by way of limitation, in a live-conversation module with four displayed posts, an update may replace one of the four displayed posts with another post that has the next-highest quality-score. In particular embodiments, the posts that replace the existing posts are not posts that were created at a later time than the replaced one or more posts. As an example and not by way of limitation, if there exists a fixed number of cached posts and the newest posts have already been displayed, the social-networking system 160 may replace the displayed posts with older posts (e.g., when an update is scheduled to occur). The older posts replacing the displayed posts may be posts with the next-highest quality-scores, as described above. As another example and not by way of limitation, a post made by an author who is a first-degree connection of the user may replace a newer post solely because of the connection of the author to the user. In particular embodiments, the updating of posts may occur indefinitely until the social-networking system 160 runs out of posts. In particular embodiments, the updating may continue even after the social-networking system 160 runs out of posts, cycling through posts that have already been displayed. Although this disclosure describes updating the live-conversation module in a particular manner, this disclosure contemplates updating any suitable module in any suitable manner.

FIG. 5 illustrates an example method 500 for generating a live-conversation module. The method may begin at step 510, where the social-networking system 160 may access one or more posts of an online social network, each post comprising a content of the post and a metadata associated with the post. At step 520, the social-networking system 160 may extract, for each post, one or more n-grams from the content of the post and the metadata associated with the post. At step 530, the social-networking system 160 may determine, for each post, whether the post is associated with a trending topic based on whether one or more of the extracted n-grams are associated with the trending topic. At step 540, the social-networking system 160 may cache, for each post determined to be associated with the trending topic, the post in a conversation cache associated with the trending topic. At step 550, the social-networking system 160 may calculate a quality-score for each cached post. At step 560, the social-networking system 160 may generate a live-conversation module comprising one or more of the cached posts having a quality-score greater than a threshold quality-score. At step 570, the social-networking system 160 may send, to a client system of a first user of the online social network, the live-conversation module for display to the first user. The live-conversation module may be sent, for example, in response to the first user accessing a search-results page of the online social network associated with the trending topic. Particular embodiments may repeat one or more steps of the method of FIG. 5, where appropriate. Although FIG. 5 and the related description above describe a live-conversation module for a trending topic, they may be equally applicable to describe a live-conversation module for any suitable topic. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating a live-conversation module including the particular steps of the method of FIG. 5, this disclosure contemplates any suitable method for generating a live-conversation module including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part by a history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 6:
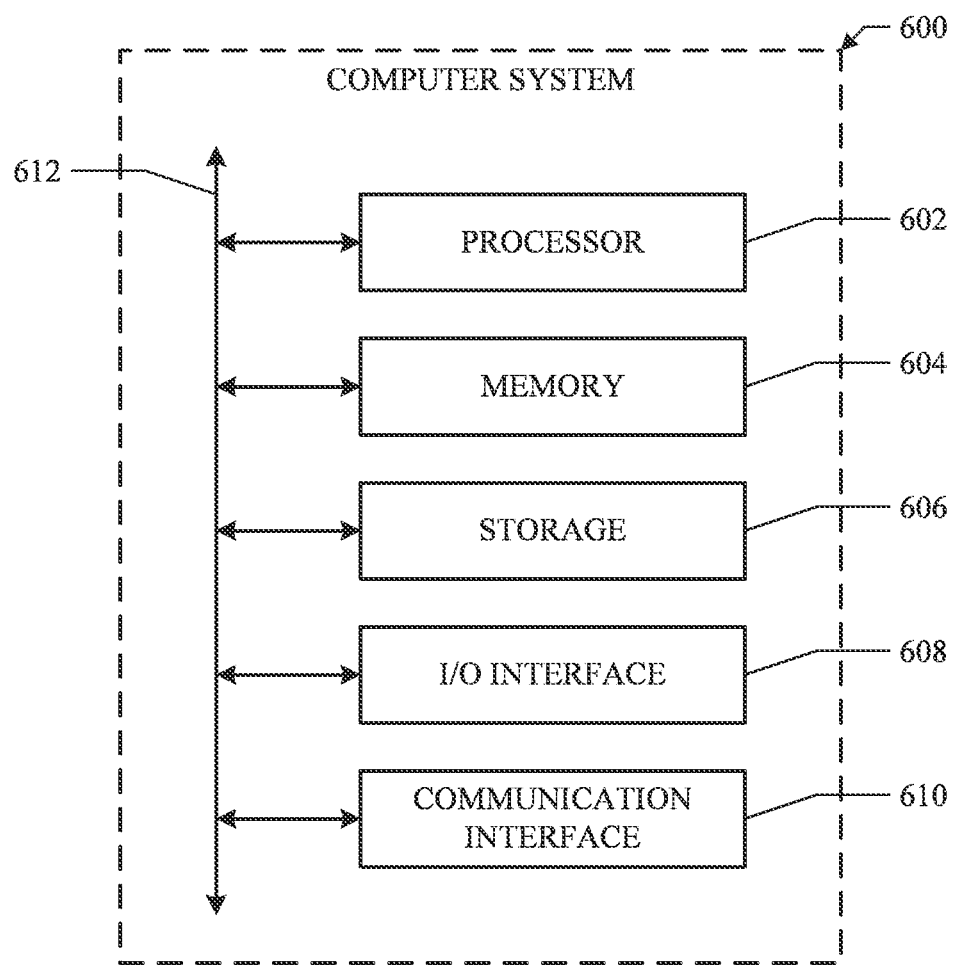
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
   accessing one or more posts of an online social network, each post comprising a content of the post and a metadata associated with the post;
   extracting, for each post, one or more n-grams from the content of the post and the metadata associated with the post;
   determining, for each post, whether the post is associated with a trending topic based on whether one or more of the extracted n-grams are associated with the trending topic;
   caching, for each post determined to be associated with the trending topic, the post in a conversation cache associated with the trending topic, wherein the conversation cache is comprised in one or more data stores associated with a social-networking system of the online social network;
   calculating a quality-score for each cached post based on information associated with an author of the cached post,
      wherein the information associated with the author of the cached post comprises information about an amount of time for which the author of the cached post has been registered as a user on the online social network, and
      wherein the quality-score for the cached post is reduced by a particular amount when it is determined that the cached post was made by the author during a probationary period, the probationary period being a predefined period of time from the time the author of the cached post first registered as a user on the online social network;
   generating a live-conversation module comprising one or more of the cached posts retrieved from the conversation cache having a quality-score greater than a predetermined threshold quality-score;
   sending, to a client system of a first user of the online social network, the live-conversation module for display to the first user; and
   sending, to the client system of the first user, update-information configured to update the live-conversation module by replacing the one or more posts in the live-conversation module with one or more other cached posts retrieved from the conversation cache, wherein the sending of the update-information occurs automatically without input from the first user.

2. The method of claim 1, further comprising:
   accessing a social graph comprising a plurality of nodes and a plurality of edges connecting the nodes, each of the edges between two of the nodes representing a single degree of separation between them, the nodes comprising:
      a first node corresponding to the first user; and
      a plurality of second nodes that each correspond to a concept or a second user associated with the online social network.

3. The method of claim 1, wherein the sending of the update-information occurs periodically.

4. The method of claim 3, wherein the one or more other posts were created on the online social network at a later time than the replaced one or more posts.

5. The method of claim 1, wherein the live-conversation module is customized for the first user to whom the live-conversation module is sent based on information associated with the first user.

6. The method of claim 5, wherein the information associated with the first user comprises demographic information of the first user.

7. The method of claim 5, wherein the quality-score for each cached post is further based on a history of activity by the first user on the online social network.

8. The method of claim 5, wherein the live-conversation module is sent to the first user in response to the first user accessing a search-results page of the online social network associated with the trending topic.

9. The method of claim 5, wherein the quality-score for each cached post is further based on an affinity coefficient between the author of the cached post and the first user.

10. The method of claim 1, further comprising:
    receiving, from the client system of the first user, a request associated with the trending topic; and
    sending, to the client system of the first user, a search-results page comprising the live-conversation module and one or more other modules associated with the trending topic.

11. The method of claim 1, wherein determining whether the post is associated with a trending topic further comprises:
    accessing a list of trending topics that are currently trending on the online social network; and
    matching the one or more n-grams from the content of the post and the metadata associated with the post with one or more n-grams associated with one or more trending topics on the list of trending topics.

12. The method of claim 1, wherein the live-conversation module comprises a maximum number of posts.

13. The method of claim 1, wherein the quality-score for each cached post is further based on an occurrence of one or more n-grams in the content of the post that are associated with spam.

14. The method of claim 1, wherein the quality-score for each cached post is further based on a sentiment of the post.

15. The method of claim 1, wherein the information associated with the author of the cached post further comprises a number of connections on the online social network that the author of the cached post has with one or more users who are associated with spam.

16. The method of claim 1, wherein the information associated with the author of the cached post further comprises demographic information of the author of the cached post.

17. The method of claim 1, wherein the conversation cache is partitioned across two or more of the data stores associated with the social-networking system.

18. One or more computer-readable non-transitory storage media embodying software that is operable when executed to:

> access one or more posts of an online social network, each post comprising a content of the post and a metadata associated with the post;
>
> extract, for each post, one or more n-grams from the content of the post and the metadata associated with the post;
>
> determine, for each post, whether the post is associated with a trending topic based on whether one or more of the extracted n-grams are associated with the trending topic;
>
> cache, for each post determined to be associated with the trending topic, the post in a conversation cache associated with the trending topic, wherein the conversation cache is comprised in one or more data stores associated with a social-networking system of the online social network;
>
> calculate a quality-score for each cached post based on information associated with an author of the cached post,
>
> > wherein the information associated with the author of the cached post comprises information about an amount of time for which the author of the cached post has been registered as a user on the online social network, and
> >
> > wherein the quality-score for the cached post is reduced by a particular amount when it is determined that the cached post was made by the author during a probationary period, the probationary period being a predefined period of time from the time the author of the cached post first registered as a user on the online social network;
>
> generate a live-conversation module comprising one or more of the cached posts retrieved from the conversation cache having a quality-score greater than a threshold quality-score;
>
> send, to a client system of a first user of the online social network, the live-conversation module for display to the first user; and
>
> send, to the client system of the first user, update-information configured to update the live-conversation module by replacing the one or more posts in the live-conversation module with one or more other cached posts retrieved from the conversation cache, wherein the sending of the update-information occurs automatically without input from the first user.

19. The media of claim 18, wherein the software is further operable when executed to:

> access a social graph comprising a plurality of nodes and a plurality of edges connecting the nodes, each of the edges between two of the nodes representing a single degree of separation between them, the nodes comprising:
>
> > a first node corresponding to the first user; and
> >
> > a plurality of second nodes that each correspond to a concept or a second user associated with the online social network.

20. The media of claim 18, wherein the sending of the update-information occurs periodically.

21. The media of claim 20, wherein the one or more other posts were created on the online social network at a later time than the replaced one or more posts.

22. The media of claim 18, wherein the live-conversation module is customized for the first user to whom the live-conversation module is sent based on information associated with the first user.

23. The media of claim 22, wherein the information associated with the user comprises demographic information of the first user.

24. The media of claim 22, wherein the quality-score for each cached post is further based on a history of activity by the first user on the online social network.

25. The media of claim 22, wherein the live-conversation module is sent to the first user in response to the first user accessing a search-results page of the online social network associated with the trending topic.

26. The media of claim 22, wherein the quality-score for each cached post is further based on an affinity coefficient between the author of the cached post and the first user.

27. The media of claim 18, wherein the software is further operable when executed to:

> receive, from the client system of the first user, a request associated with the trending topic; and
>
> send, to the client system of the first user, a search-results page comprising the live-conversation module and one or more other modules associated with the trending topic.

28. The media of claim 18, wherein the software when executed to determine whether the post is associated with a trending topic is further operable when executed to:

> access a list of trending topics that are currently trending on the online social network; and
>
> match the one or more n-grams from the content of the post and the metadata associated with the post with one or more n-grams associated with one or more trending topics on the list of trending topics.

29. The media of claim 18, wherein the live-conversation module comprises a maximum number of posts.

30. The media of claim 18, wherein the quality-score for each cached post is further based on an occurrence of one or more n-grams in the content of the post that are associated with spam.

31. The media of claim 18, wherein the quality-score for each cached post is further based on a sentiment of the post.

32. The media of claim 18, wherein the information associated with the author of the cached post further comprises a number of connections on the online social network that the author of the cached post has with one or more users who are associated with spam.

33. The media of claim 18, wherein the information associated with the author of the cached post further comprises demographic information of the author of the cached post.

34. The media of claim 18, wherein the conversation cache is partitioned across two or more of the data stores associated with the social-networking system.

35. A system comprising: one or more processors; and a non-transitory memory coupled to the processors comprising instructions executable by the processors, the processors operable when executing the instructions to:

> access one or more posts of an online social network, each post comprising a content of the post and a metadata associated with the post;
>
> extract, for each post, one or more n-grams from the content of the post and the metadata associated with the post;

determine, for each post, whether the post is associated with a trending topic based on whether one or more of the extracted n-grams are associated with the trending topic;

cache, for each post determined to be associated with the trending topic, the post in a conversation cache associated with the trending topic, wherein the conversation cache is comprised in one or more data stores associated with a social-networking system of the online social network;

calculate a quality-score for each cached post based on information associated with an author of the cached post,
 wherein the information associated with the author of the cached post comprises information about an amount of time for which the author of the cached post has been registered as a user on the online social network, and
 wherein the quality-score for the cached post is reduced by a particular amount when it is determined that the cached post was made by the author during a probationary period, the probationary period being a predefined period of time from the time the author of the cached post first registered as a user on the online social network;

generate a live-conversation module comprising one or more of the cached posts retrieved from the conversation cache having a quality-score greater than a threshold quality-score;

send, to a client system of a first user of the online social network, the live-conversation module for display to the first user; and send, to the client system of the first user, update-information configured to update the live-conversation module by replacing the one or more posts in the live-conversation module with one or more other cached posts retrieved from the conversation cache, wherein the sending of the update-information occurs automatically without input from the first user.

* * * * *